US012756350B2

(12) United States Patent
Jourdain De Thieulloy

(10) Patent No.: US 12,756,350 B2
(45) Date of Patent: Oct. 6, 2026

(54) MOVABLE MOUNTING ARRANGEMENT FOR PHOTOVOLTAIC INSTALLATIONS

(71) Applicant: NOMAD SOLAR ENERGY, S.L., Madrid (ES)

(72) Inventor: Laurent Jean-Baptiste Marie Bruno Jourdain De Thieulloy, Madrid (ES)

(73) Assignee: NOMAD SOLAR ENERGY, S.L., Madrid (ES)

( * ) Notice: Subject to any disclaimer, the term of this patent is extended or adjusted under 35 U.S.C. 154(b) by 0 days.

(21) Appl. No.: 19/006,239

(22) Filed: Dec. 31, 2024

(65) Prior Publication Data

US 2026/0128707 A1 May 7, 2026

(30) Foreign Application Priority Data

Nov. 5, 2024 (ES) ............................ ES202432038U

(51) Int. Cl.

*H02S 10/40* (2014.01)
*F16M 11/42* (2006.01)
*H02S 20/30* (2014.01)
*H02S 30/10* (2014.01)
*H02S 30/20* (2014.01)

(52) U.S. Cl.

CPC ............. *H02S 10/40* (2014.12); *F16M 11/42* (2013.01); *H02S 20/30* (2014.12); *H02S 30/10* (2014.12); *H02S 30/20* (2014.12)

(58) Field of Classification Search

CPC .......... H02S 10/40; H02S 30/10; H02S 20/30; H02S 30/20; F16M 11/42
See application file for complete search history.

(56) References Cited

U.S. PATENT DOCUMENTS 4,155,524 A * 5/1979 Marello ................. B64G 1/443 244/172.6
6,031,178 A * 2/2000 Kester ...................... B64G 1/44 16/75
6,650,085 B2 * 11/2003 Lau ......................... H02S 30/20 320/101
6,737,573 B2 * 5/2004 Yeh ......................... H02S 30/20 136/251
7,162,774 B1 * 1/2007 Von Resch ............ E05D 7/0054 16/236
8,371,088 B2 * 2/2013 Merrifield ............... E04C 3/005 52/109
9,046,281 B2 * 6/2015 Curran .................... F24S 25/10
9,246,035 B2 * 1/2016 Eaton, Jr. .................. H02J 7/35
9,249,565 B2 * 2/2016 Merrifield ................ B64G 1/22
9,553,544 B2 * 1/2017 Nayar ................... F24S 25/636
9,559,232 B1 * 1/2017 Naud ...................... H02S 30/20
(Continued)

FOREIGN PATENT DOCUMENTS

DE 3010571 A1 * 9/1981

*Primary Examiner* — Stanton L Krycinski
(74) *Attorney, Agent, or Firm* — Bayramoglu Law Offices LLC

(57) ABSTRACT

A mounting arrangement for movable frames designed to support photovoltaic panels is particularly provided for the attachment between two contiguous frames through a hinged attachment system, such that it allows the frames to be attached with a variable angle between them and in a minimum amount of space. The hinged attachment system includes a first fixing segment, a second fixing segment, and limiting means.

11 Claims, 7 Drawing Sheets

(56) References Cited

U.S. PATENT DOCUMENTS

| | | | | |
|---|---|---|---|---|
| 10,079,503 | B2 * | 9/2018 | Burton | B60J 3/0204 |
| 10,742,163 | B2 * | 8/2020 | Tehan | H02S 10/40 |
| 10,773,833 | B1 * | 9/2020 | Harvey | B64G 1/443 |
| 11,558,005 | B2 * | 1/2023 | Tehan | H02S 10/40 |
| 11,870,388 | B2 * | 1/2024 | Albertella | H02S 30/10 |
| 12,009,779 | B2 * | 6/2024 | Oakley, Jr. | H02S 40/36 |
| 12,040,740 | B2 * | 7/2024 | Freestone | B64G 1/2228 |
| 2009/0160396 | A1 * | 6/2009 | Shyu | H04M 19/08 320/101 |
| 2009/0320898 | A1 * | 12/2009 | Gumm | F24S 25/61 136/245 |
| 2010/0156339 | A1 * | 6/2010 | Hoffman | H02S 10/40 320/101 |
| 2011/0253193 | A1 * | 10/2011 | Korman | H10F 19/80 136/245 |
| 2011/0253614 | A1 * | 10/2011 | Curran | H02S 30/20 136/245 |
| 2011/0259393 | A1 * | 10/2011 | Lai | H02S 30/20 136/245 |
| 2012/0090659 | A1 * | 4/2012 | Muchow | H02S 10/40 136/245 |
| 2012/0313569 | A1 * | 12/2012 | Curran | H02S 30/20 136/246 |
| 2013/0186450 | A1 * | 7/2013 | Smith | F24S 20/50 136/245 |
| 2013/0240015 | A1 * | 9/2013 | Chaimovski | H02S 30/20 136/245 |
| 2015/0179848 | A1 * | 6/2015 | Korman | H02S 30/20 29/592.1 |
| 2016/0173025 | A1 * | 6/2016 | Baumgartner | F24S 30/20 136/245 |
| 2018/0119994 | A1 * | 5/2018 | Helming | F24S 20/70 |
| 2020/0091861 | A1 * | 3/2020 | Tally | H02S 10/40 |
| 2021/0203274 | A1 * | 7/2021 | Jun | H10F 77/00 |
| 2024/0113655 | A1 * | 4/2024 | Hartl | F16M 11/2021 |
| 2024/0305242 | A1 * | 9/2024 | Van Den Bos | H02S 30/20 |
| 2024/0429858 | A1 * | 12/2024 | Xie | H10F 77/40 |
| 2025/0088143 | A1 * | 3/2025 | Shen | H02S 30/20 |
| 2025/0167724 | A1 * | 5/2025 | Gibb | B64G 1/443 |
| 2025/0253799 | A1 * | 8/2025 | Villalobos | G05D 3/105 |
| 2025/0350234 | A1 * | 11/2025 | Brunhart | H02S 20/32 |
| 2025/0379543 | A1 * | 12/2025 | Zhou | H02S 10/40 |
| 2025/0392253 | A1 * | 12/2025 | Meyer | H02S 10/40 |

* cited by examiner

MOVABLE MOUNTING ARRANGEMENT FOR PHOTOVOLTAIC INSTALLATIONS

CROSS REFERENCE TO THE RELATED APPLICATIONS

This application is based upon and claims priority to Spanish Patent Application No. ES U202432038, filed on Nov. 5, 2024, the entire contents of which are incorporated herein by reference.

TECHNICAL FIELD

The object of the present invention is to provide a mounting arrangement for movable frames designed to support photovoltaic panels, particularly provided for the attachment between two contiguous frames through a hinged attachment system, such that it allows the frames to be attached with a variable angle between them and in a minimum amount of space.

BACKGROUND

The arrangement of deployment systems for photovoltaic panels on terrain, such that they facilitate the installation, removal, and transfer of said panels, is well known today within the field of renewable energies, and very particularly in the field of photovoltaic energy.

However, such systems can be expensive and have a greater limitation in terms of the number of photovoltaic panels to be installed, since such systems have previously defined structures for a specific number of photovoltaic panels and from a constructive viewpoint, they can be bulky in their folded condition and be more expensive to manufacture since they require guiding means, such as rails or tracks for deployment.

To that end, there is still a need to find an arrangement with an attachment system that is easy to manufacture and therefore also less expensive economically.

Furthermore, the applicant is currently unaware of any invention that has all of the features described in this specification.

SUMMARY

The present invention has been developed with the aim of providing a mounting arrangement for photovoltaic installations which is configured as a novelty within the field of application and solves the previously mentioned drawbacks, also contributing other additional advantages that will be obvious from the description below.

Therefore, an object of the present invention is to provide a movable mounting arrangement for photovoltaic installations, provided for the attachment between two contiguous frames each configured to support at least one photovoltaic panel through a hinged attachment system including:

- a fixing segment linked to a frame of a photovoltaic panel;
- a second fixing segment linked to a frame of a second contiguous photovoltaic panel, the first and second fixing segments being associated with one another through a shaft, with an end of the shaft being coupled to a mobility element; and
- limiting means provided to limit an angle of deployment defined by the two frames.

In particular, the invention is characterised in that the shaft is made up of a single oblong piece having a plurality of segments of different diameters, such that following an order from the outer part to the inner part, there are provided a first segment configured for the coupling of the mobility element, a second segment of a larger diameter than the first segment configured to act as a stop for the hinged attachment system and the mobility element, a third segment of a different diameter than the first segment, which is provided for coupling to the first and second fixing segments of the hinged attachment system, and a fourth segment provided with a threaded area configured for the coupling of a threaded stop element.

Preferably, the mobility element consists of a wheel.

According to the invention, the limiting means mentioned above consist of a tensioning member capable of varying its length, with each of the two ends thereof being fixed to an attachment member that is linked to the shaft.

Preferably, the attachment member which is part of the arrangement of the invention is made up of a body with an elongated shape in a longitudinal axis, having a first central region provided for coupling to the shaft, and two attachment regions at the ends, each of them with a hook-shaped termination defined by a grooved portion, such that the tensioning member can be coupled in a releasable manner in the grooved portion.

According to the invention, the elongated body forming the attachment member has, when seen in a profile view, a central segment with an offset segment which is located in a plane parallel to the rest of the body.

Preferably, the tensioning member is a chain with multiple links, although other tensioning members such as, for example, metal cables with high mechanical strength, can also be used.

Additionally, the arrangement can include anchoring means that can be linked to the shaft, which are configured to keep the wheel immovable on a support surface or on the ground.

Preferably, the anchoring means consist of a bar that can be fixed at one end to the shaft mentioned above where the wheel is coupled, whereas the opposite end is attached to a plate.

According to the invention, the threaded stop element present on the shaft can be a conventional nut, simplifying the mounting process.

As a result of this mounting system, not only the portability and arrangement of the photovoltaic panels at a variable angle of inclination, for example 15-20°, with respect to the horizontal plane of the ground is favoured in order to optimise energy efficiency, but it is also carried out by means of a system that is easy to manufacture and that operators can easily mount. In this way, frame deployment is facilitated and the time for deploying the frames, either on flat terrain or on terrain having a type of irregularity on its surface, is reduced.

The fact that the frames including the photovoltaic panels can be folded not only entails advantages in terms of transport, since they require less volume during storage, but it also implies a reduction in the costs of transport from the point of manufacture to the point of installation to form a photovoltaic installation.

Thus, the arrangement described represents an innovative structure with structural and constituent features heretofore unknown for its intended purpose, reasons which, taken together with its usefulness, provide it with sufficient grounds for obtaining the requested exclusivity privilege.

Other features and advantages of the arrangement object of the present invention will become apparent from the description of a preferred but not exclusive embodiment illustrated by way of non-limiting example in the attached drawings, in which:

DETAILED DESCRIPTION OF THE EMBODIMENTS

In view of the aforementioned figures, and in accordance with the adopted numbering, a preferred exemplary embodiment of the invention is disclosed, which includes the parts and elements indicated and described in detail below.

Moreover, the terms first, second, third, and the like in the description and in the claims are used to distinguish between similar elements and not necessarily to describe a sequential or chronological order. The terms may be interchanged under appropriate circumstances and the embodiments of the invention may operate in sequences other than those described or illustrated herein.

Moreover, the terms upper, lower, up, down, and the like in the description and in the claims are used for descriptive purposes and not necessarily to describe relative positions.

The figures show an embodiment of a movable mounting arrangement for a photovoltaic installation formed by a plurality of photovoltaic panels, generally indicated with reference number (1), which is provided for the attachment between two frames (10) supporting one or more photovoltaic panels (1) that are contiguous and linked to one another through a hinged attachment system described below located on two opposite lower sides of each frame.

The photovoltaic panels will not be described in detail since they can be panels available on the market today.

The frames (10) are each formed by a framework-like scaffold with a rectangular shape.

Figure 1:
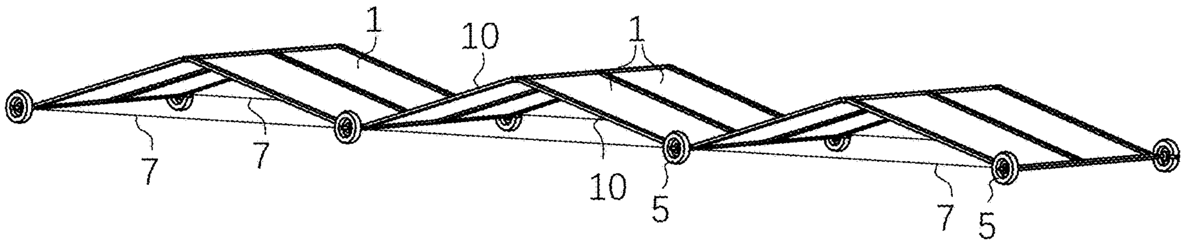
FIG. 1 is a schematic perspective view of a mounting arrangement for photovoltaic installations according to the present invention in a partially deployed position.
Figure 2:
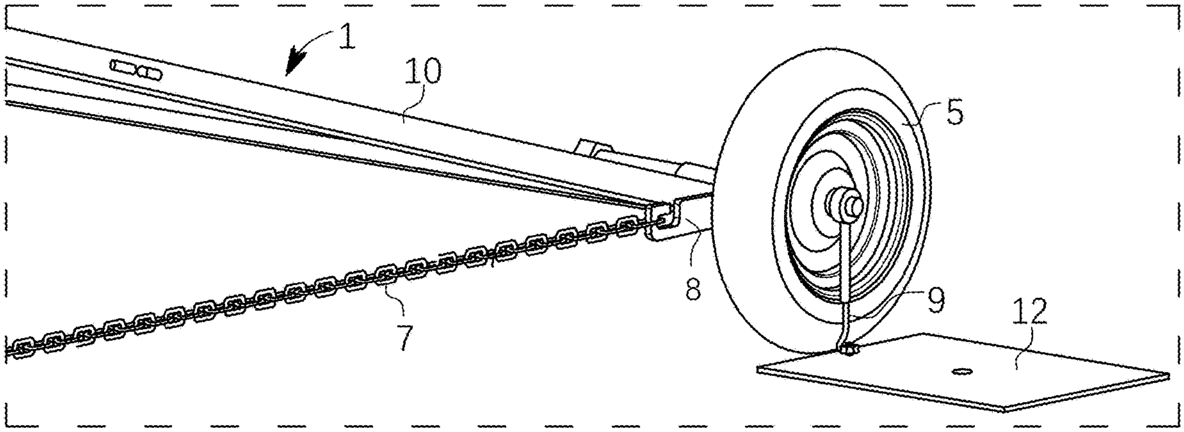
FIG. 2 is a detailed perspective view of the area where one of the removable wheels is located.
Figure 3:
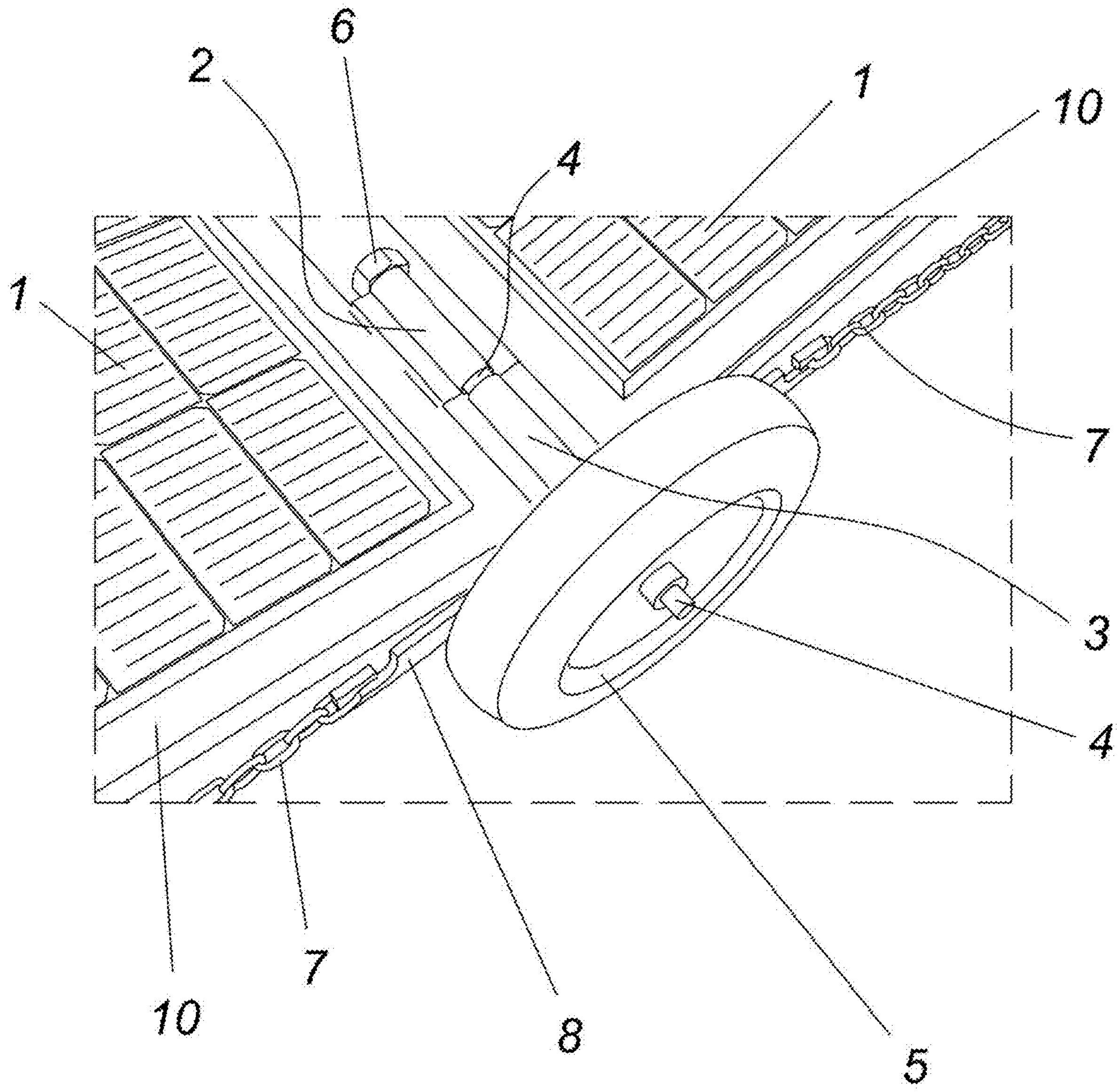
FIG. 3 is a detailed partial top perspective view of the area where a hinged attachment system is arranged, in which some parts have been omitted for the sake of clarity.

This arrangement allows the frames (10) supporting the photovoltaic panels (1) to be in a folded position, such that they are arranged in a vertical plane and parallel to one another, whereas, in a second deployed position, i.e., an operating position of the photovoltaic installation, the frames (10) are each deployed angularly, as shown in FIG. 1.

In particular, each of the two hinged attachment systems located on facing or opposite sides include a fixing segment (2) linked to the frame (10) which supports photovoltaic panels (1); a second fixing segment (3) linked to the frame (10) of a second contiguous photovoltaic panel, with the first and second fixing segments (2) and (3) being associated with one another through a shaft (4), with an end of the shaft (4) being coupled to a mobility element including a wheel (5) to facilitate the deployment and folding of contiguous frames (10).

The arrangement also includes limiting means provided to limit the angle of deployment which is defined between two contiguous frames (10), that will be described below.

Figure 4A:
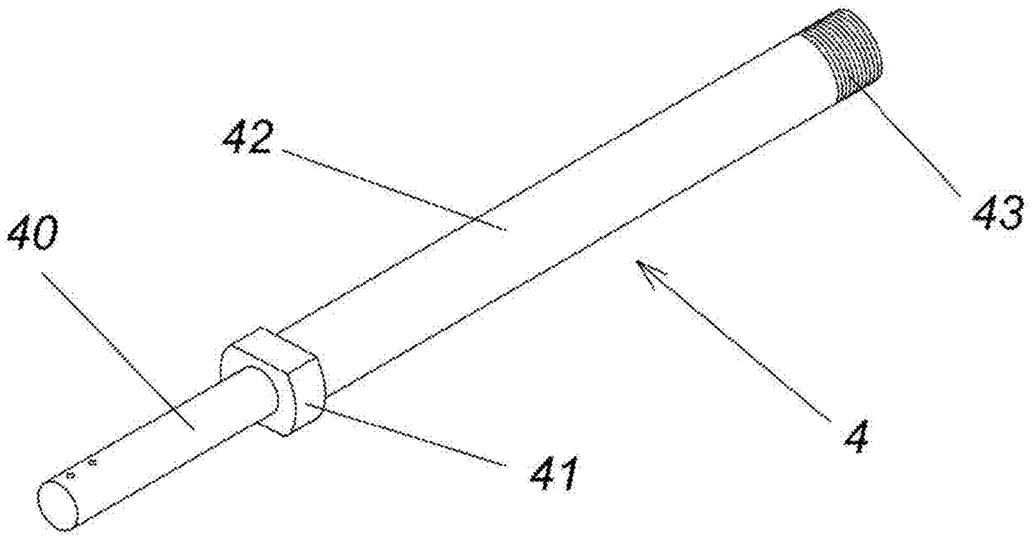
FIGS. 4A-4C are the perspective view, side elevational view, and front view of the shaft.
Figure 4B:
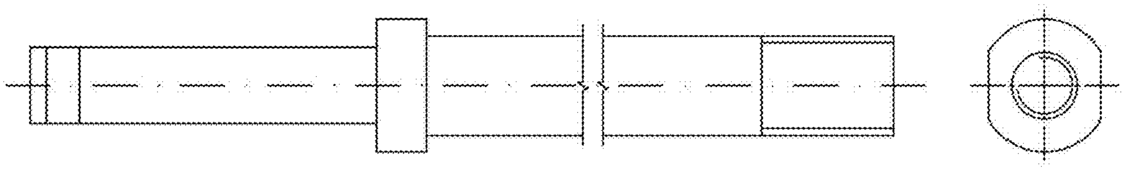
Figure 4C:
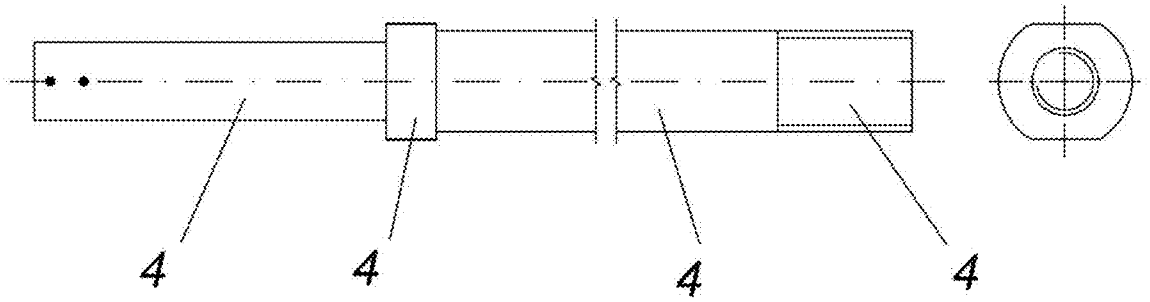

Making particular reference to FIGS. 4A-4C, the shaft (4) is made up of a single oblong piece having a plurality of segments of different diameters, such that following an order from the outer part to the inner part, there are provided a first segment (40) configured for the coupling of the mobility element, a second segment (41) of a larger diameter than the first segment (40) of the shaft configured to act as a stop for the positioning of the wheel (4), a third segment (42) of a different diameter than the first segment (40), which is provided for coupling to the first and second fixing segments of the hinged attachment system. Finally, a fourth segment (43) provided with a threaded area configured for the coupling of a threaded stop element consisting of a nut (6) is provided.

With respect to the limiting means, they consist of a tensioning member (7) consisting of a chain with multiple links capable of varying its length, with each of the two ends thereof being fixed to an attachment member (8) that is linked to the shaft (4). In this way, the angle of inclination of each of the two frames (10) can be varied, thereby allowing all of them to have the same angle of inclination, depending on the length of the tensioning member (7).

Figure 5:
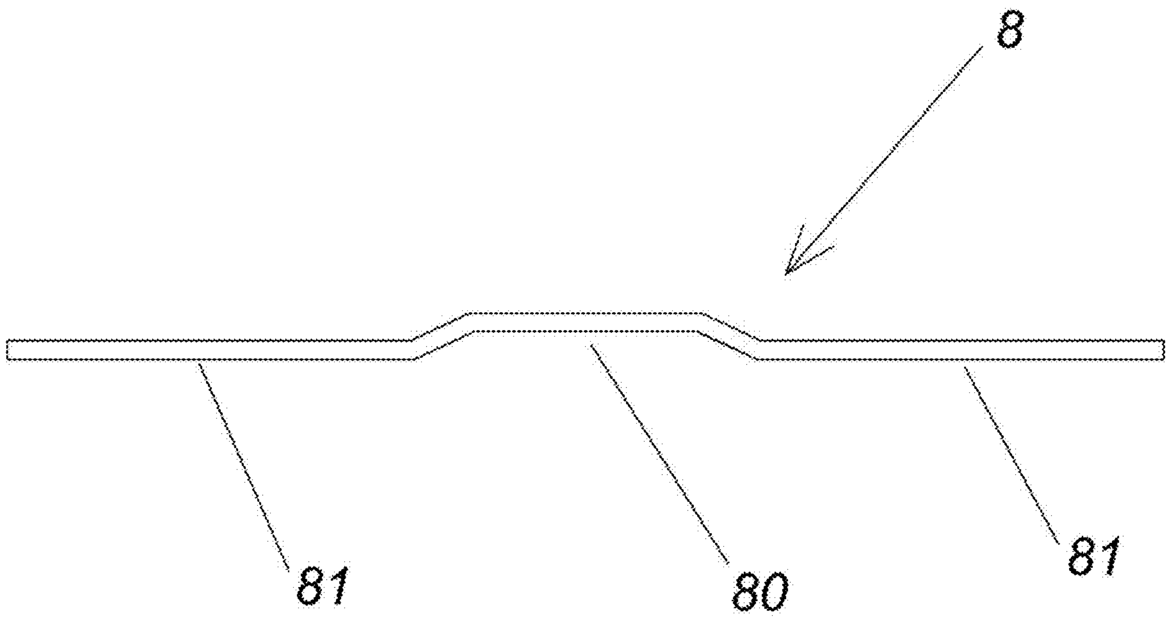
FIG. 5 is an elevational view of the attachment member which is part of the attachment system.
Figure 6:
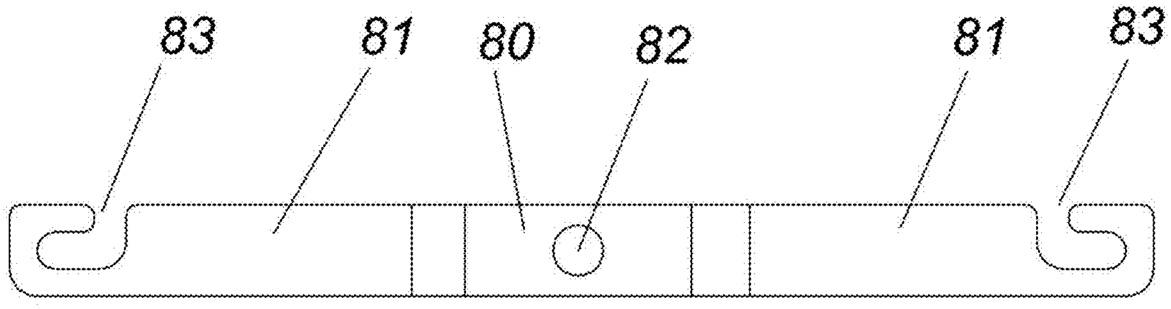
FIG. 6 is a plan view of the attachment member which is part of the attachment system.

As can be seen in more detail in FIGS. 5-6, the attachment member (8) mentioned above is made up of a body with an elongated shape in a longitudinal axis, having a first central region (80) provided for coupling to the shaft (4) through a through hole (82), and two end attachment regions (81) located at the opposite ends, each of them with a hook-shaped termination defined by a grooved portion, such that the tensioning member (7) (for example, a chain with links) can be coupled in a releasable manner in the grooved portion (83).

It should be mentioned that the elongated body forming the attachment member (8) has, when seen in a profile view, a central segment coinciding with the first central region (80) which is offset, i.e., located in a plane parallel to the rest of the body forming the attachment member (8), which allows preventing friction between the different pieces during the rolling movement of the wheel (5).

Additionally, anchoring means that can be linked to the shaft (4), which are configured to keep the wheel (5) immovable on a support surface or on the ground, can be provided. These anchoring means consist of a bar (9) that can be fixed at one end to the shaft (4) where the wheel (5) is coupled, whereas the opposite end is attached to a plate (12) with a reduced thickness, a rectangular shape, and a flat surface, which allows, for example, manually and readily placing an additional counterweight element (not depicted) or an anchoring element through a hole (120) made on the plate (12) itself.

Figure 7:
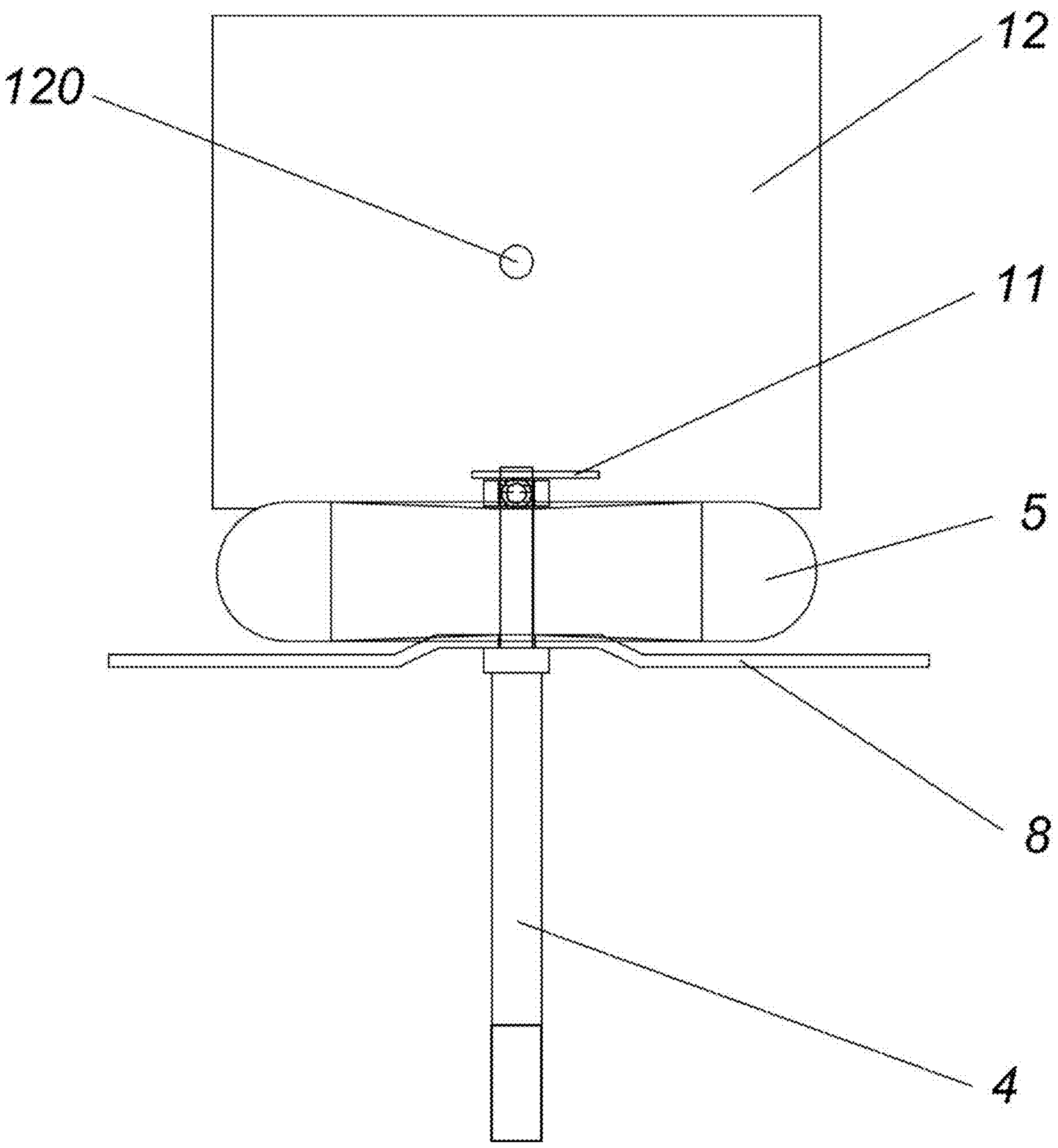
FIG. 7 is a schematic plan view showing the mechanical linkage of various parts of the attachment system and anchoring means, in which some parts have been omitted for the sake of clarity.
Figure 8:
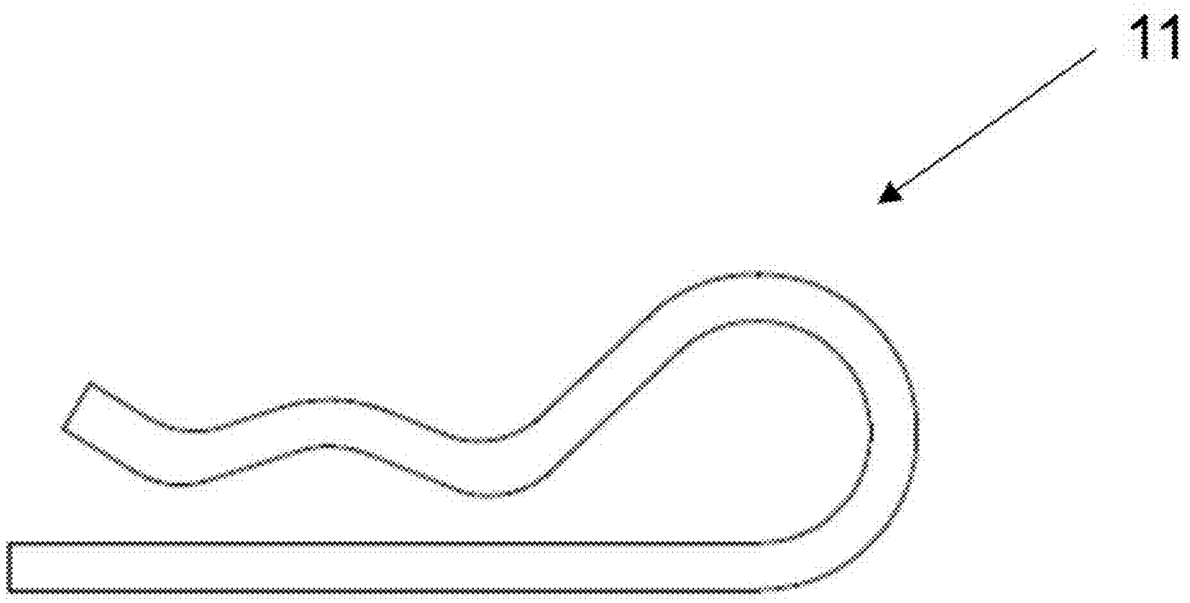
FIG. 8 is an elevational view of an embodiment of the locking pin which is part of the attachment system.

To keep the wheels coupled, a locking pin (11) (see FIG. 7) configured to go through at least one hole made on the shaft (4) is provided.

Furthermore, a counterweight (or anchoring) system can be provided to keep the wheel (5) stable on the ground level.

The details, shapes, dimensions and other complementary elements used in the manufacturing of the mounting arrangement of the invention may be suitably replaced with others that do not depart from the scope defined by the claims below.

What is claimed is:

1. A movable mounting arrangement for photovoltaic installations, provided for an attachment between a first frame and a second frame through a hinged attachment system, wherein each of the first frame and the second frame is configured to support at least one photovoltaic panel, and the hinged attachment system comprises:

a first fixing segment linked to the first frame;

a second fixing segment linked to the second frame contiguous to the first frame, wherein the first fixing segment and the second fixing segment are associated with one another through a shaft, and an end of the shaft is coupled to a mobility element; and limiting means provided to limit an angle of deployment defined by the first frame and the second frame;

wherein the shaft is made up of a single oblong piece having a plurality of segments of different diameters, such that following an order from an outer part to an inner part, there are provided a first segment configured for coupling of the mobility element, a second segment of a larger diameter than the first segment configured to act as a stop for the hinged attachment system and the mobility element, a third segment of a different diameter than the first segment, and a fourth segment provided with a threaded area configured for coupling of a threaded stop element, wherein the third segment is provided for coupling to the first fixing segment and the second fixing segment of the hinged attachment system.

2. The movable mounting arrangement according to claim 1, wherein the mobility element comprises a wheel.

3. The movable mounting arrangement according to claim 1, wherein the limiting means comprise a tensioning member allowed for varying length of the tensioning member, wherein each of two ends of the tensioning member is fixed to an attachment member, wherein the attachment member is linked to the shaft.

4. The movable mounting arrangement according to claim 3, wherein the attachment member is made up of an elongated body having a first central region provided for coupling to the shaft and two attachment regions at ends of the elongated body, and each of the two attachment regions is provided with a hook-shaped termination defined by a grooved portion, such that the tensioning member is configured to be coupled in a releasable manner in the grooved portion of the hook-shaped termination.

5. The movable mounting arrangement according to claim 4, wherein the elongated body forming the attachment member has, when seen in a profile view, a central segment with an offset segment, wherein the offset segment is located in a plane parallel to a rest of the elongated body.

6. The movable mounting arrangement according to claim 3, wherein the tensioning member is a chain with a plurality of links.

7. The movable mounting arrangement according to claim 1, further comprising anchoring means, wherein the anchoring means are configured to be linked to the shaft, and the anchoring means are configured to keep the mobility element immovable on a support surface or on ground, wherein the mobility element comprises a wheel.

8. The movable mounting arrangement according to claim 7, wherein the anchoring means comprise a bar, wherein a first end of the bar is configured to be fixed to the shaft where the mobility element is coupled, and an opposite second end of the bar is attached to a plate.

9. The movable mounting arrangement according to claim 8, wherein the plate has a flat surface and a hole made on the same flat surface.

10. The movable mounting arrangement according to claim 1, wherein the threaded stop element is a nut.

11. The movable mounting arrangement according to claim 1, wherein each of the first frame and the second frame is formed by a framework with a rectangular shape.

* * * * *